Re. 25367

April 10, 1956 S. R. CRAY 2,741,758

MAGNETIC CORE LOGICAL CIRCUITS

Filed Oct. 28, 1954 2 Sheets-Sheet 1

INVENTOR
SEYMOUR R.CRAY

BY
Cushman, Darby & Cushman
ATTORNEYS

April 10, 1956 S. R. CRAY 2,741,758

MAGNETIC CORE LOGICAL CIRCUITS

Filed Oct. 28, 1954 2 Sheets-Sheet 2

INVENTOR
SEYMOUR R. CRAY

BY Cushman, Darby & Cushman
ATTORNEYS

United States Patent Office 2,741,758

Patented Apr. 10, 1956

2,741,758

MAGNETIC CORE LOGICAL CIRCUITS

Seymour R. Cray, Minneapolis, Minn., assignor, by mesne assignments, to Sperry Rand Corporation, New York, N. Y., a corporation of Delaware Application October 28, 1954, Serial No. 465,177

29 Claims. (Cl. 340—174)

This invention relates to magnetic devices which utilize the hysteresis characteristic of magnetic materials as a means for storing and handling information.

The value of small cores of magnetic material for use as storage and logical elements in electronic data handling systems is being increasingly recognized, particularly because of their miniature size, low power requirements, dependability and ability to retain stored information for long periods of time in spite of power failure. These magnetic elements are able to store binary information in the form of static residual magnetization after being even momentarily magnetized to saturation in either of two directions. The saturation can be achieved by passing a current pulse through a winding on the magnetic element. Switching is accomplished by applying a current pulse, which may conveniently be termed a transfer current, to a winding to create a surge of magnetomotive force in the sense opposite to the preexisting flux direction, thereby driving the element to saturation in the opposite polarity. In so doing, a voltage pulse will be induced in other windings on the element. If a winding on one element is connected to a winding on a second element, the induced voltage will produce in the second element a magnetomotive force which drives that element to the opposite polarity, provided the magnetomotive force exceeds a certain critical value and is applied in the direction opposite to the original residual flux direction of the second element. On the other hand, magnetizing pulses applied to the first element which drive it further into saturation in the same direction produce a change in flux which is small compared to that created in reversing its polarity and hence induce a voltage in its output winding that is smaller than the minimum required to switch the second element.

In order to achieve a good ratio between the output from the first element when it is driven to the opposite polarity as compared to its output in driving it to saturation in its original polarity, the magnetic material of the element is preferably one having a generally rectangular hysteresis characteristic so that the residual flux density is a relatively large percentage of the flux density present during the application of a saturating magnetomotive force. A number of suitable magnetic materials are available such as "Mumetal," "Permalloy" and ferromagnetic ferrites. In order to improve high frequency response by reducing eddy current losses, "Mumetal" and "Permalloy" are preferably used in thin strips which may be wrapped around ceramic spools while ferrite elements may be molded and windings placed directly thereon, inasmuch as ferrites are relatively free from eddy current effects.

While magnetic elements have been increasingly utilized in electronic data handling systems, their use has been to a certain extent inhibited by a number of difficulties. For instance, in the transfer of information from one element to the next, it is inevitable that some energy loss take place. This loss is increased by the fact that all previously known networks utilizing magnetic elements require the use of resistors. Moreover, in a great many switching operations the windings operate as transformer devices and so involve a further loss in power. These losses become very significant in a practical data handling system. Further power losses are also incurred in effecting switching operations by using summing or cancelling procedures, a general requirement when using previously known techniques to design complete logical circuit systems based on magnetic elements.

It is accordingly an object of this invention to provide improved magnetic devices having saturable core elements and connecting circuitry.

It is a further object of this invention to provide a combination of magnetic elements together with rectifier elements which comprise a basic circuit component which in various arrays may make up the complete control and arithmetic section of an electronic digital computer.

It is another object of this invention to provide a logical circuit comprising magnetic elements which is characterized by its efficiency in holding power requirements to a minimum.

It is another object to provide a generalized logical circuit system based on magnetic switches wherein electrical resistors are not utilized.

It is a further object of this invention to provide a generalized logical circuit system based on magnetic switches wherein switching is performed under no load conditions.

It is a further object of this invention to provide a combination of magnetic switches which is independent of summing or cancelling effects.

According to the invention, information is transferred from one magnetic storage element to another by driving the first magnetic element to a given saturation state, say arbitrarily designated as "cleared," by a transfer current unconditionally flowing through a winding on said first element. A suitable transfer current may be obtained from one of a number of well known sources such as from miniature or subminiature vacuum tubes, transistors, or from a central power source through a current limiting resistor. If the magnetic elements are constructed of material having a generally rectangular hysteresis characteristic, the voltage induced in the windings on the first element and accordingly applied to the second element is very small if the first element does not change state during this process. However, the continued application of small voltage pulses to the second magnetic element could have the effect of demagnetizing that element, with deleterious results in certain applications. In addition, it might sometimes be desirable to practice this invention using magnetic materials having a more rounded hysteresis characteristic. It is accordingly another object of this invention to provide a switching system based on magnetic elements in which the switching is substantially free from false signals.

Other objects include specific types of basic circuits utilizing the principles of the invention.

The foregoing objects together with other novel features forming further objects of the invention will be apparent and best understood from the following description and claims when considered in connection with the drawings, in which:

Figures 1, 2, 3, 4:
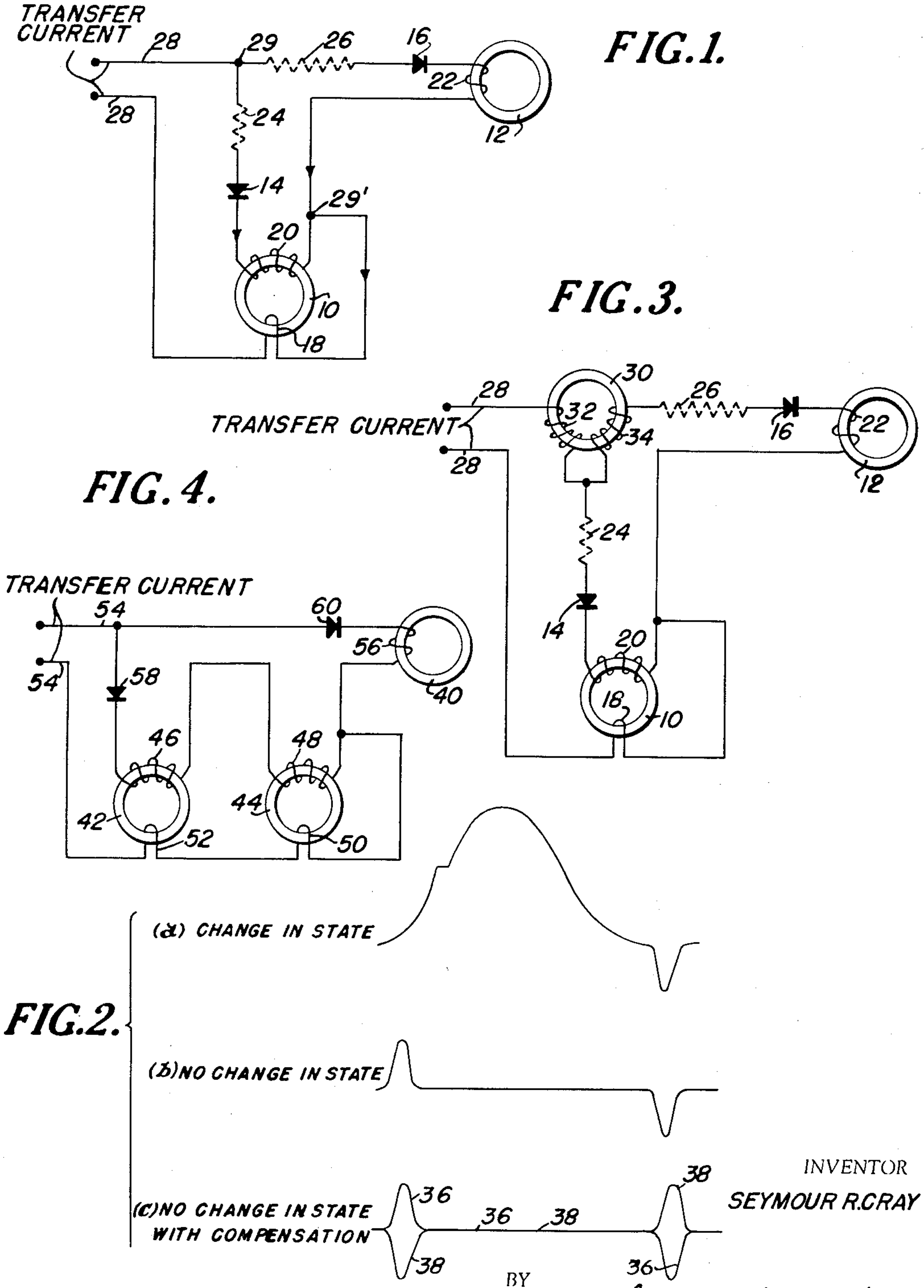
Figure 1 is an illustration of a circuit showing the basic logic of this invention.
Figure 2 shows the waveforms induced in windings on the magnetic elements of Figures 1 and 3 when momentarily magnetized to saturation.
Figure 3 shows a modification of the circuit of Figure 1 whereby the driving of a magnetic element further into saturation in the direction of its residual flux produces substantially no output.
Figure 4 is a schematic diagram of a "logical or" circuit embodying the principles of this invention.

The cores of the magnetic elements are shown in the drawings to be toroidal in shape. However, the shape of the cores is not critical as long as good coupling is achieved between the core and its windings. Toroidal cores are especially satisfactory in this respect and incidentally produces a minimum external field. Each toroid is provided with one or more windings which are symbolically represented as consisting of one, two and four turns each. A single turn represents the number of turns through which the transfer current must flow to just switch a storage element from one saturation state to the other. More than one turn in a winding roughly indicates the proportional number of turns therein relative to a winding shown by a single turn. However, it will be appreciated by those skilled in the art when reading the following description that considerable latitude in the relative number of turns is permissible.

Referring now to Figure 1, there is shown a circuit comprised of two substantially identical magnetic storage elements 10, 12 and two rectifier elements 14, 16 in which element 10 is to be read positively and element 12 is conditionally set. Rectifier elements 14, 16 are preferably crystal diodes which are so selected that diode 14 has an appreciably higher conductivity than does diode 16. Element 10 is provided with two windings 18, 20, and element 12 is provided with a single winding 22. Windings 18, 20 and 22 are symbolically represented by 1, 4 and 2 turns, respectively, to indicate in general the relative number of turns in each, as explained above. The resistances 24, 26 are not present as such in the circuit but represent the inherent resistances in windings 20, 22 and the forward resistances of diodes 14, 16, respectively. Hence, resistance 26 is appreciably greater than resistance 24 since it largely represents the resistance in the relatively low conductivity diode 16.

Considering first the case in which magnetic storage element 10 was previously cleared, and element 12 is in a given state, a transfer current on line 28 unconditionally flows through winding 18 on element 10 in a direction to clear and divides between the other two possible paths according to the resistive voltage drops and any back or bucking voltages induced in the windings. Since the element 10 was previously cleared, winding 20 will appear as a virtual short circuit because the continued saturation condition prevents any appreciable induction of voltage in winding 20. Consequently, only the small voltage drop through diode 14 will appear in this path. Since resistance 26 is appreciably greater than resistance 24, and/or the back voltage is nil, the majority of the current passes through winding 20 while a relatively small proportion flows through winding 22 on storage element 12. As long as the current through winding 22 is less than the minimum required to bring the magnetomotive force in element 12 above the critical value needed to reverse its polarity, there is no change in the state of element 12 (assuming that its state permits of shift).

Now consider the case in which element 10 was previously set. The transfer current on line 28 again flows unconditionally through winding 18 on element 10 in a direction to clear and element 10 switches its state. This causes voltages to be induced in windings 18 and 20 which are proportional to their relative number of turns. That is, the amplitude of the voltage induced in winding 20 is roughly four times that induced in winding 18 and, by the same token, roughly twice that which would be induced in winding 22 if element 12 were changing state at the same rate. As a result, diode 14 is cut off by the back voltage generated in winding 20 and all of the transfer current flows through winding 22, applying to element 12 twice the switching force which is present on element 10. Hence, element 12 is switched more rapidly than element 10 and is completed switched before the induced voltage which controls the transfer has disappeared.

It will be appreciated that by reversing leads to windings 18 and 20, the transfer current can be made to drive element 10 to that state arbitrarily designated as "set," in which case the state of element 12 may be switched only if element 10 was previously cleared. In addition, element 12 may be either cleared or set on the condition that the state of element 10 is switched, depending on the polarity of connection and direction of winding 22. Hence, this invention may be used to force either conditionally or unconditionally a magnetic storage element to either of its two possible states of magnetic saturation.

The circuit of Figure 1 may be otherwise described as including a first saturable core element 10 and a second saturable core element 12, and having a transfer current path connected to leads 28, this path comprising a first section including winding 20 and a second section including winding 22. The sections branch off from the main path at section points 29 and 29'. Beyond the sections, the transfer current path includes winding 18 on the first element. The basic operation of the circuit depends upon winding 20 being so arranged that when element 10 shifts from one state to another the voltage induced in winding 20 opposes transfer current flow in that direction. When the element 10 does not change its state there is insufficient back voltage generated to cause sufficient current to flow in winding 22 to shift element 12 (if shiftable). However, when element 10 shifts its state in response to current through winding 18 the back voltage is sufficient to block current flow through the first section to provide the result that enough current flows through the second section and winding 22 to shift the element 12.

The uni-directional conducting devices 14 and 16 are not absolutely required for the basic circuit. However, in practice they are provided for preventing loop currents from flowing through the first and second sections. Such currents could adversely influence the operation of the device. It should be noted that when transfer current is not flowing, diodes 14 and 16 prevent a loop current as a result of any combination of induced voltages in the windings, such as might be generated by additional windings (not shown) on the elements for read out, setting, clearing and other purposes. Magnetic storage elements 10 and 12 are accordingly switched under no load conditions at all times.

It may further be noted that with or without the unidirectional devices, the resistance of the sections need not be different, but the aforestated difference does contribute to better operation.

While the basic circuit of Figure 1 may be expanded to the performance of any logical function, all magnetic elements in such expanded circuits are switched only under no load conditions. Consequently, no resistive elements need be incorporated into any circuit based on the logic of Figure 1, which resistive elements have previously been required to prevent the short-circuiting of one or more windings under certain conditions. This capacity for no-load switching enables this invention to be applied to complex networks of logical circuits with the power per logical circuit a function of the total number of contributing elements rather than a function of the logical depth.

Reference is now made to Figure 2, part (*a*) of which shows a representative voltage waveform induced in every winding on a magnetic storage element when that element changes state. If the storage element is magnetized to saturation in a direction such that it does not change state, the waveform induced in response to a pulse of transfer current is of the type shown in part (*b*). While the amplitudes of the two voltages thus induced differ to a considerable extend, it will be appreciated that certain applications would make it desirable to eliminate the waveform of part (*b*).

A modification of the basic circuit of Figure 1 is shown in Figure 3 whereby the voltage applied to element 12 when element 10 is not changing state is substantially nullified. To this end, an additional magnetic storage element 30 is connected into the circuit by means of two windings 32, 34, which windings are applied in series-aiding. Element 30 is always in the cleared state so that a transfer current on line 28 merely drives it further into saturation in its original polarity. When element 10 is in the cleared state so that the transfer current is in effect short circuited through winding 20, a voltage having the waveform of part (*b*) of Figure 2 is induced in winding 20 and applied to winding 22 on element 12. However, the transfer current in flowing through winding 32 on element 30 causes a voltage of the same waveform to be induced in winding 34, which voltage is applied to winding 22 on element 12 in the opposite direction to the voltage from winding 20. Referring to part (*c*) of Figure 2, it is seen that if the voltage from winding 20 takes the waveform 36, as applied to winding 22, the voltage from winding 34 will appear as the curve 38. Since voltages 36 and 38 tend to cancel each other out, substantially no voltage is applied to winding 22 when the flux in element 10 does not undergo a change in polarity.

The circuit illustrated in Figure 3 is the equivalent of that of Figure 1 and so could be used in demonstrating the application of the invention to the performance of various logical operations. However, in order to provide a more ready understanding of the principles involved, the circuit of Figure 1 will be considered. In addition, only the rudimentary essentials of the exemplary circuits will be illustrated. It will be appreciated by those familiar with the art that each of the various magnetic storage elements shown may be supplied with one or more windings (not shown) through which such elements may be set or cleared or to carry induced voltage pulses to other electronic or to electromechanical devices. The invention can thus, together with suitable input and output devices, form the entire control and arithmetic functions of a large-scale electronic data handling system.

The manner in which the basic circuit of Figure 1 may be applied to function as a so-called "logical or" circuit is illustrated in Figure 4, to which reference now is made. In this circuit magnetic storage element 40 is set on the condition that either storage element 42 or element 44 were previously set. If both elements 42 and 44 were previously cleared, the path through windings 46, 48, 50 and 52 appears as a short circuit, and the majority of the transfer current on line 54 bypasses winding 56 on element 40. If either element 42 or 44 was previously set, a sufficiently large voltage is induced in the winding 46 or 48 on that element to cut off diode 58 and force all of the transfer current through winding 56 on storage element 40. This circuit could be made to clear element 40 on the condition that either element 42 or element 44 be previously set by reversing the leads to winding 56.

Figure 5:
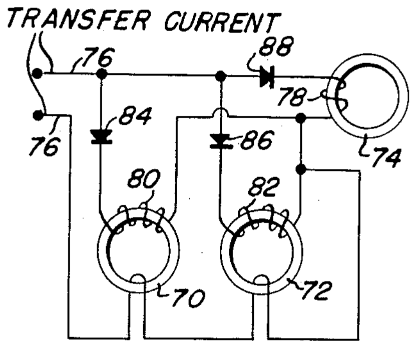
Figure 5 is a schematic diagram of a "logical and" circuit which is another embodiment of this invention.

Figure 5 illustrates the application of this invention to a "logical and" circuit in which both storage elements 70 and 72 must be previously set to cause element 74 to be set. The transfer current on line 76 in this case has three possible paths. If either element 70 or element 72 was previously cleared, a short circuit appears across the corresponding path, and most of the current would bypass the winding 78 on element 74. If both elements 70 and 72 were previously set, a voltage is induced in both windings 80 and 82, cutting off the corresponding diodes 84 and 86 and forcing all of the transfer current to flow through the winding 78, thereby saturating element 74 in the arbitrarily designated "set" direction. Here three rectifier elements 84, 86, 88 are required to prevent loop currents as a result of induced voltages in the windings.

Figure 6:
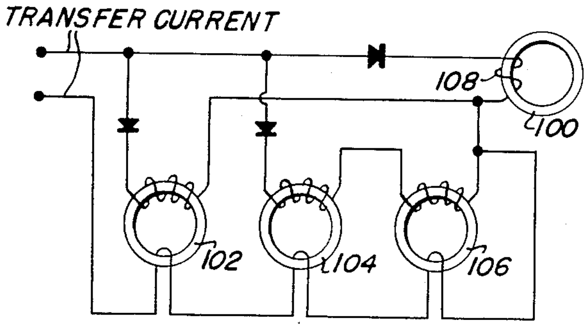
Figure 6 shows a circuit which combines the logical functions of the circuits of Figures 4 and 5 into a single "or-and" circuit.

Reference is now made to Figure 6 in which is shown a circuit for satisfying the logical expression: "Set D on the condition A and (B or C)." That is, storage element 100 is set if both element 102 and either element 104 or 106 were previously set. It will be appreciated that a short circuit will result to allow the transfer current to bypass winding 108 on element 100 if the condition is not met, but not otherwise.

Figure 7:
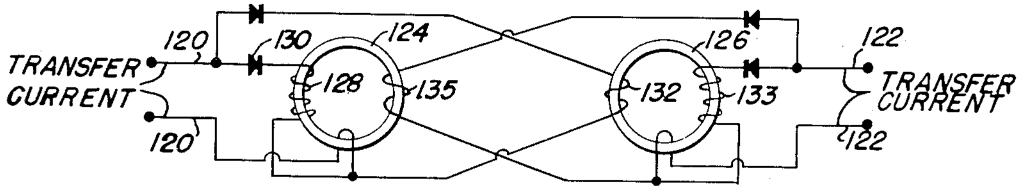
Figure 7 is a schematic diagram of a circuit which is the functional equivalent of a flip-flop or bi-stable multivibrator.

In addition to its use in logical circuits, this invention may be applied directly to any component of an electronic digital data handling system. Figure 7 illustrates means for applying this invention to perform the function of a flip-flop or bistable multivibrator. The so-called flip-flop of Figure 7 also has a special distinction in that the information stored thereby can be read out non-destructively, a capability not generally found in magnetic circuits. Operation of the flip-flop requires two independent transfer currents on lines 120 and 122, respectively, which transfer current may conveniently, but not necessarily, be arranged to occur periodically at alternate clock periods. The flip-flop includes two magnetic storage elements 124, 126, both of which are forced to that state which has been arbitrarily designated as cleared if the flip-flop is to store the binary number "0." Then transfer currents on either line 120 or line 122 do not change the state of either element 124 or element 126 so that both elements remain in the cleared state. To set the flip-flop to its "1" position, either or both of elements 124, 126 are set by a current pulse in a winding or windings thereon (not shown). If, for example, element 124 were set, a transfer current on line 120 would switch that element to the cleared state and in so doing induce a voltage in winding 128 to cut off diode 130, forcing the transfer current on line 120 to flow through winding 132 on element 126, reversing its polarity. A transfer current on line 122 would switch element 126 to the cleared state, setting element 124. It will be appreciated by those skilled in the art that by providing either or both of storage elements 124, 126 with an additional winding (not shown) for output purposes, switching of the elements produces a voltage pulse on such output line or lines to indicate that the flip-flop stores a "1" while no output will be generated for a stored "0."

The circuit of Figure 7 may be otherwise analyzed as including a first transfer current path connected to leads 120 and having a first section including winding 128 and a second section including winding 132. A second transfer current path is connected to leads 122, a first section of this path including winding 133 and a second section including winding 135. The complete analysis of Figures 1, 2 and 3 otherwise applies to the two basic circuits thus formed.

Figure 7A:
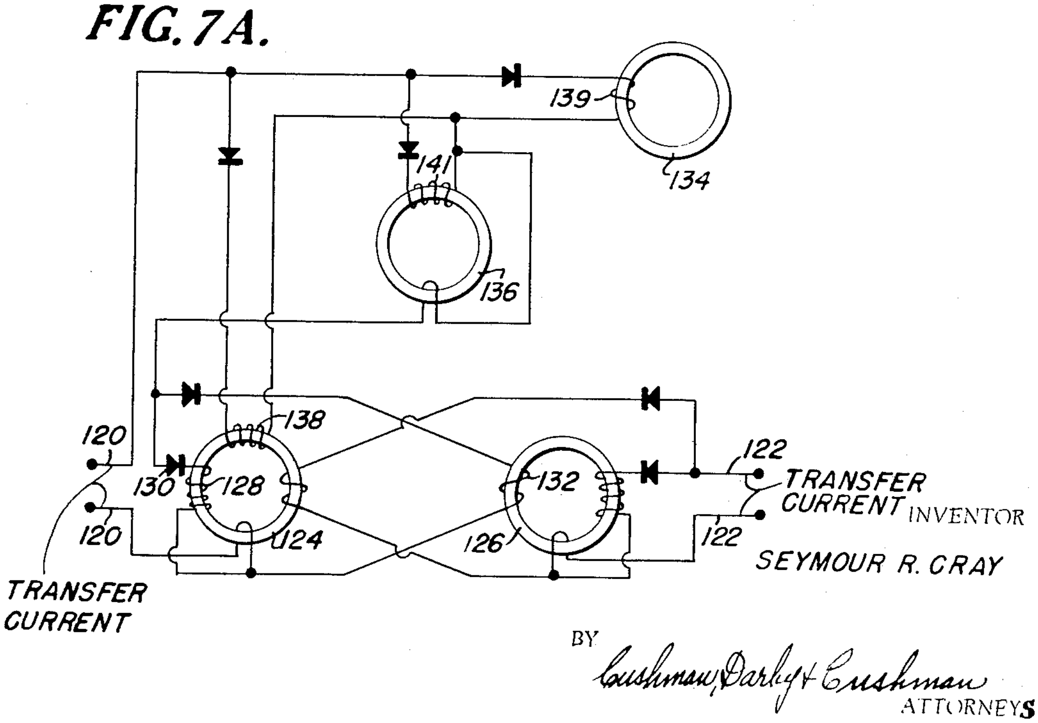
Figure 7A illustrates means for integrating the circuit of Figure 7 into a digital data handling system.

Figure 7A shows how Figure 7 could be expanded to set an element 134 on the condition that the flip-flop stores a "1" and an additional element 136 be previously set. With additional winding 138 on element 124 serving as the flip-flop output winding, element 134 is set on the occurrence of a transfer current on line 120 if the flip-flop stores a "1" and the gate associated with its output is open by virtue of magnetic storage element 136 being set. The similar extension of the circuit of Figure 7 to include the "or" circuit of Figure 4, etc., will be apparent.

In Figure 7A the first transfer current path may be considered as opened to receive in series therewith a branch circuit having first, second and third sections, the first section including winding 138, the second section including winding 139 on the element 134, and the third section including winding 141 on element 136.

Element 134 could be one of a number of storage elements in another computer component such as a shifting register, counter, or the like, or it might have a control function. In the latter event, it could be provided with additional input and output windings so arranged that when tested for a "1" on an input winding, the resultant pulse on its storing a 1 initiates a certain operation. Alternatively, the pulse used to set element 134 could, after amplification or other suitable modification, be used in the driving of an electric typewriter or the control of a servo mechanism as will be appreciated by those skilled in the art.

While this invention has been illustrated by only a few simple circuits, it is equally applicable to complex networks such as shifting registers, accumulators, and automatic control mechanisms without departing from the basic principles of invention whereby all switching is accomplished under no load conditions, without resistors, and with each element switched under the control of a single isolated magnetomotive force. Complex functions can thus be performed at high operating speeds and low power consumption with no power limitation due to logical depth. Numerous modifications could be made in the various embodiments by which this invention has been illustrated without departing from the inventive concept thereof. Therefore, it is intended that the matter contained in the foregoing description and the appurtenant drawings be considered as illustrative and not in a limiting sense. The scope of the invention is to be determined from the appended claims.

What is claimed is:

1. A magnetic device comprising at least first and second saturable core elements, a current path having two sections in parallel, the first section including a first winding on the first element, the second section including a winding on the second element, means for applying a voltage drop across said path to cause current to flow therein, the said first winding on the first element being arranged to generate during shift of the first element a voltage which is in opposition to current flow in said first section, means including a transfer winding on the first element for carrying a transfer current coexisting in time with the first mentioned current, the arrangement being such that transfer current in said transfer winding in amount sufficient to but in a direction against shift of the first element will cause the current in said path to divide due to low induced back voltage in the first winding of the first element between said two sections with insufficient current in the second section to shift the second element, and transfer current in amount sufficient to and in a direction to shift the first element will cause the current in the path to divide due to higher back voltage induced in said first winding of said first element between said two sections with sufficient current in the second path to shift the second element.

2. A device as in claim 1 wherein the transfer winding on the first element is connected in the current path beyond the sections thereof.

3. A device as in claim 1 wherein the second section has greater resistance to current flow than the first section, whereby current in the second path is accordingly limited when said low back voltage is generated in the first section.

4. A device as in claim 1 wherein each section of the current path includes a uni-directional conducting device connected to conduct in the same direction in the respective sections to prevent loop currents in the respective windings during operation of the device.

5. A device as in claim 4 wherein the uni-directional conducting device in the first section has a greater conductivity in its conducting direction than the uni-directional conducting device in the second section.

6. A device as in claim 5 and further including a third saturable core element, a first winding on the third element connected to carry at least a part of the current in the first section of the path, a second winding on the third element connected in the second section of the current path, the arrangement being that such current through the first winding tends to maintain the third element in a given state and wherein current pulses in the first winding of the third element induce a voltage in the second winding of the third element to buck the voltage induced in the first winding of the first element and applied to the winding of the second element when the first element does not change its state.

7. A device as in claim 6 wherein the first winding on the third element is connected in the current path beyond the sections thereof.

8. A device as in claim 5 wherein the transfer winding on the first element is connected in the current path beyond the sections thereof, whereby the transfer current separates between the said path sections as aforesaid.

9. A device as in claim 4 wherein the first winding on the first element has a greater number of turns than the second winding on the first element and the winding on the second element has an intermediate number of turns.

10. A device as in claim 9 wherein the turns ratio of the respective windings is 4 to 1 between the first and second windings on the first element and 4 to 2 between the first winding on the first element and the winding on the second element.

11. A device as in claim 1 and further including a third saturable core element, a first winding on the third element connected to carry at least a part of the current in the first section of the path, a second winding on the third element connected in the second section of the current path, the arrangement being such that current through the first winding on the third element tends to maintain the third element in a given state and wherein current pulses in the first winding of the third element induce a voltage in the second winding of the third element to buck the voltage induced in the first winding of the first element and applied to the winding of the second element when the first element does not change its state.

12. A device as in claim 11 wherein the first winding on the third element is connected in the current path beyond the sections thereof.

13. A device as in claim 1 wherein the first winding on the first element has a greater number of turns than the second winding on the first element and the winding on the second element has an intermediate number of turns.

14. A device as in claim 13 wherein the turns ratio of the respective windings is 4 to 1 between the first and second windings on the first element and 4 to 2 between the first winding on the first element and the winding on the second element.

15. A device as in claim 10 wherein the transfer winding on the first element is connected in the current path beyond the sections thereof, whereby the transfer current separates between the said path sections as aforesaid.

16. A device as in claim 13 wherein the transfer winding on the first element is connected in the current path beyond the sections thereof, whereby the transfer current separates between the said path sections as aforesaid.

17. A device as in claim 1 and further including an additional saturable core element, said additional element having a first winding in the first section of the current path in series with the first winding on the first element, and the additional element having a transfer winding in a circuit with the transfer winding of the first elecent, the arrangement being such that shift of the first element or the additional element will cause sufficient current to flow in the second section to shift the second element.

18. A device as in claim 17 wherein each circuit section includes a uni-directional conducting device, all of said devices being arranged to conduct in the same direction with respect to the current path in which it is connected, the arrangement being such that loop currents among the sections are prevented during operation of the device.

19. A device as in claim 17 wherein the transfer winding on the third element is connected in series with the transfer winding on the first element with both transfer windings being connected in the current path beyond the sections thereof, whereby the transfer current divides between the said path sections as aforesaid.

20. A device as in claim 1 and further including an additional saturable core element, said additional element having a first winding in a third section of the current path, said third section being in parallel with the first section, the additional element having a transfer winding in a circuit with the transfer winding of the first element, the arrangement being such that shift of the first element and additional element is required to cause sufficient current in the second path to shift the second element.

21. A device as in claim 20 wherein each circuit section includes a uni-directional conducting device, all of said devices being arranged to conduct in the same direction with respect to the current path in which it is connected, the arrangement being such that loop currents among the sections are prevented during operation of the device.

22. A device as in claim 20 wherein the transfer winding on the third element is connected in series with the transfer winding on the first element with both transfer windings being connected in the current path beyond the sections thereof, whereby the transfer current divides between the said path sections as aforesaid.

23. A device as in claim 1 and further including third and fourth saturable core elements, the third and fourth elements each having first windings in series in a third section of the current path, said third section being in parallel with the first section, the third and fourth elements having transfer windings in a circuit with each other and with the transfer winding of the first element for carrying the transfer current, the arrangement being such that shift of the first element and one or the other of the third and fourth elements is necessary to cause sufficient current to flow in the second element to cause shift thereof.

24. A device as in claim 23 wherein each circuit section includes a uni-directional conducting device, all of said devices being arranged to conduct in the same direction with respect to the current path in which it is connected, the arrangement being such that loop currents among the sections are prevented during operation of the device.

25. A device as in claim 23 wherein the transfer windings on the third and fourth elements are connected in series with the transfer winding of the first element in said current path beyond the sections thereof, whereby the transfer current divides between the sections as aforesaid.

26. A device as in claim 1 and further including a second current path having a first section and a second section, independent means including a transfer winding for applying a transfer current to the second element, means for causing current to flow in the second path while transfer current is applied thereto, the first section of the second path including a winding on the second element, the second section of the second path including a winding on the first element, the arrangement being such that with one of the elements previously in a state to permit shift due to transfer current, transfer current flowing in the transfer winding of one element followed by transfer current flowing in the transfer winding of the other element will cause a shift of at least one of the elements.

27. A device as in claim 26 having a third and a fourth element, the first current path beyond the sections thereof including a branch current path in series with the first path, the branch having first, second and third sections, the first section of the branch including a winding on the first element, the second section of the branch having a winding on the third element, the third section having a winding on the fourth element, the branch beyond the sections thereof having a winding on the third element, the first and second sections of the branch being in parallel with each other and with the third section of the branch, the arrangement being such that sufficient current to shift the fourth element will flow in the third section of the branch only if simultaneous shift of the first and third elements occurs.

28. A device as in claim 27 wherein each circuit section includes a uni-directional conducting device, all of said devices being arranged to conduct in the same direction with respect to the current path in which it is connected, the arrangement being such that loop currents among the sections are prevented during operation of the device.

29. A device as in claim 26 wherein each circuit section includes a uni-directional conducting device, all of said devices being arranged to conduct in the same direction with respect to the transfer current path in which it is connected, the arrangement being such that loop currents among the sections are prevented during operation of the device.

No references cited.